United States Patent [19]

Farr

[11] Patent Number: 4,474,413
[45] Date of Patent: Oct. 2, 1984

[54] HYDRAULIC ANTI-SKID BRAKING SYSTEMS FOR VEHICLES

[75] Inventor: Glyn Phillip R. Farr, Leek Wootton, England

[73] Assignee: Lucas Industries Public Limited Company, Birmingham, England

[21] Appl. No.: 436,665

[22] Filed: Oct. 26, 1982

[30] Foreign Application Priority Data

Nov. 9, 1981 [GB] United Kingdom ................. 8133771
Jan. 13, 1982 [GB] United Kingdom ................. 8200946

[51] Int. Cl.³ ............................................. B60T 8/087
[52] U.S. Cl. .................................................... 303/116
[58] Field of Search ............. 188/181 A, 344; 303/10, 303/11, 61, 113, 115, 116

[56] References Cited

U.S. PATENT DOCUMENTS

4,387,934 6/1983 Farr ..................................... 303/116

FOREIGN PATENT DOCUMENTS

2029914 3/1980 United Kingdom ................. 303/116
2069639 8/1981 United Kingdom ................. 303/116

*Primary Examiner*—Duane A. Reger

*Attorney, Agent, or Firm*—Scrivener Clarke Scrivener and Johnson

[57] ABSTRACT

In an hydraulic anti-skid braking system for a vehicle a supply of fluid from a master cylinder is modulated by a modulator assembly in accordance with skid signals from a skid sensing means device, and an hydraulic pump incorporating at least one plunger has a working chamber in communication with the modulator assembly to control brake re-application following skid correction. The modulator assembly incorporates a piston which is normally urged into an advanced inoperative position against a stop by a spring, in which position the piston holds a spring-loaded valve in an open position to place the master cylinder in communication with the brake. Support and expander chambers on opposite sides of the piston are interconnected at all times by a restricted passage with the support chamber defined in a bore in which the piston is guided to slide, between the piston and normally closed dump valve. Thus the position of the piston in the bore is determined by the loading in the spring either augmented or opposed by a force applied to the piston due to any pressure drop across the restricted passage.

7 Claims, 3 Drawing Figures

HYDRAULIC ANTI-SKID BRAKING SYSTEMS FOR VEHICLES

SPECIFIC DESCRIPTION

This invention relates to hydraulic anti-skid braking systems for vehicles of the kind in which a supply of operating fluid from a supply to a vehicle brake is modulated by a modulator assembly in accordance with skid signals from skid sensing means, and an hydraulic pump incorporating at least one plunger working in a bore has a working chamber which is in communication with the modulator assembly to control brake re-application following skid correction.

An anti-skid braking system of the kind set forth is disclosed in our GB patent application No. 2069640A. In that system the modulator assembly comprises an expander piston which is normally urged into an advanced inoperative position against a stop by a spring, in which position the piston holds a spring-loaded valve in an open position to place an inlet port connected to the supply, suitably an hydraulic master cylinder, in communication with an outlet port connected to the brake. The piston is normally held in this inoperative position by a volume of fluid trapped in a support chamber which is defined in a bore in which the piston works, between the piston and a dump valve operable by the skid sensing means, the piston carrying at least one seal for sealing engagement with the bore. In response to a skid signal the dump valve releases fluid from the support chamber to a reservoir to permit the piston to move away from the stop against the loading in the spring, initially to permit the valve to close, thereby isolating the master cylinder from the brake, and subsequent movement of the piston in the same direction is operative to relieve the pressure applied to the brake by drawing fluid from the brake-line into an expander chamber, the release of fluid from the support chamber also causing the pump to pump fluid at low pressure through a closed circuit including the reservoir, the working chamber and the support chamber. At the termination of the skid signal the dump valve closes to isolate the support chamber from the reservoir and the pump generates a pressure in the support chamber to urge the expander piston towards its advanced position, thereby re-applying the brake.

In the braking system of GB patent application No. 2069640A a situation can arise in which the brake may not be able to be re-applied at the termination of a skid. Assume the vehicle comes to rest before the pump has fully returned the expander piston so that the spring-loaded valve is closed to isolate the supply from the brake. If the pump is driven by the wheel there will be no further output from the pump. Thus only the force in the spring alone is available to move the expander piston in a direction to open the valve, and this force has to overcome the friction of the seal of the piston, to draw fluid into the support chamber from the reservoir, to overcome the spring-loading of the spring loaded valve, and to overcome the force due to the pressure from the master cylinder acting on the spring-loaded valve, since the pressure in the brake will be less than that generated in the master cylinder. When the brake is subsequently released, the expander piston can only return to its original position and re-open the spring-loaded valve if the spring is strong enough to overcome the friction of the seal of the piston, to draw fluid into the input chamber, and to overcome the spring loading of the spring-loaded valve.

Since the spring must be sufficiently strong to achieve this effect, say to achieve a loading equivalent to 35 p.s i., this limits the pressure to which brakeline pressure can be reduced when the vehicle is travelling over surfaces of low co-efficients of friction to, say, 20 p.s.i. If we provide a lighter spring, the spring may be insufficiently strong to draw fluid into the support chamber from the reservoir and to overcome the seal friction. The expander piston will therefore remain in its partially retracted position and the spring-loaded valve will remain closed.

On the subsequent brake application the pump will start to work in response to master cylinder pressure and although the operator will immediately feel firm resistance there will be a delay in achieving the required retardation since the pump must first return the expander piston to its normal inoperative position to re-establish fluid communication between the master cylinder and the brake.

It is also difficult to bleed the braking system of GB patent application No. 2069640A since the support chamber and the expander chamber are sealed from each other by the seal carried by the expander piston.

According to our invention in an hydraulic antiskid system of the kind set forth the modulator assembly incorporates a piston which is normally urged into an advanced inoperative position against a stop by a spring, in which position the piston holds a spring-loaded valve in an open position to place an inlet port connected to the supply in communication with an outlet port connected to the brake, and support and expander chambers on opposite sides of the piston are interconnected at all times by a restricted passage with the support chamber being defined in a bore in which the piston is guided to slide, between the piston and a normally closed dump valve, whereby the position of the piston in its bore is determined by the loading in the spring either augmented or opposed by a force applied to the piston due to any pressure drop across the restricted passage.

Preferably the piston does not carry a seal.

In a "brakes off" position the piston is held in the advanced position by the spring.

When the brake is applied normally in the absence of a skid signal with the dump valve closed the restricted passage equalises the pressures on opposite sides of the piston so that the piston is held in its advanced position by the spring.

When a skid signal is operative and the dump valve is open with the support chamber in communication with the reservoir, the piston is held in a retracted position in which the spring-loaded valve is closed to isolate the supply from the brake due to a net force applied to the piston by a pressure drop across the piston due to the fluid at lower pressure which is being returned to the reservoir through the restricted passage and which overcomes the force in the spring. It follows therefore that upon removal of this force, which will occur when the pump stops, the spring returns the piston to its advanced position to open the spring-loaded valve and re-establish communication between the supply and the brake, once the master cylinder pressure is released.

The support chamber and the expander chamber may also be interconnected by a by-pass which remains closed until the piston has been moved away from its advanced position and towards its retracted position through a predetermined distance at least sufficient to enable the spring-loaded valve to close whereafter the by-pass opens to permit fluid from the brake to be returned to the reservoir, without first passing through the restricted passage.

The by-pass enables the modulator to dump rapidly large volumes of fluid, as is required when the vehicle passes from a surface having a relatively high coefficient of friction to one having a relatively low co-efficient of friction.

Preferably initial reduction in the pressure applied to the brake is achieved by movement of the piston towards its retracted position to increase the effective volume of the expander chamber, and by flow through the by-pass passage itself, and the by-pass opens towards the latter part of the movement of the piston towards its retracted position.

The by-pass may be constituted by a passage in a housing in which is provided the bore in which the piston is guided to slide, with one end of the passage being in permanent open communication with the expander chamber and the opposite end terminating at a port in the wall of the bore, which port is closed by the piston to close the by-pass, the piston being provided with radial passage means to provide communication between the two chambers when the piston has moved through the said predetermined distance at which point the radial passage means and the port are aligned.

The radial passage means may comprise a radial groove in the outer wall of the piston, and a diametral passage in the piston connecting the groove to the support chamber, whereby the piston acts in a similar manner to that of a valve spool.

The spring can be relatively light since no seal friction has to be overcome and no fluid is withdrawn from the reservoir when the piston returns to its advanced position, since both sides of the piston are interconnected.

Providing a relatively light spring enables us to reduce the brake pressure to a relatively low figure, say 5 p.s.i., when a skid signal is operative, and at the termination of a skid signal the brake is re-applied by the pump up to the pressure of the supply, before the spring-loaded valve re-opens. This prevents a sudden increase in the pressure applied to the brake.

Preferably the pressure from the pump is supplied directly to the expander chamber.

Since opposite sides of the piston are interconnected bleeding of the system is facilitated since bleeding can take place through the restricted passage.

Preferably the restricted passage comprises an orifice in the piston itself.

One embodiment of our invention is illustrated in the accompanying drawings in which.

Figure 1:
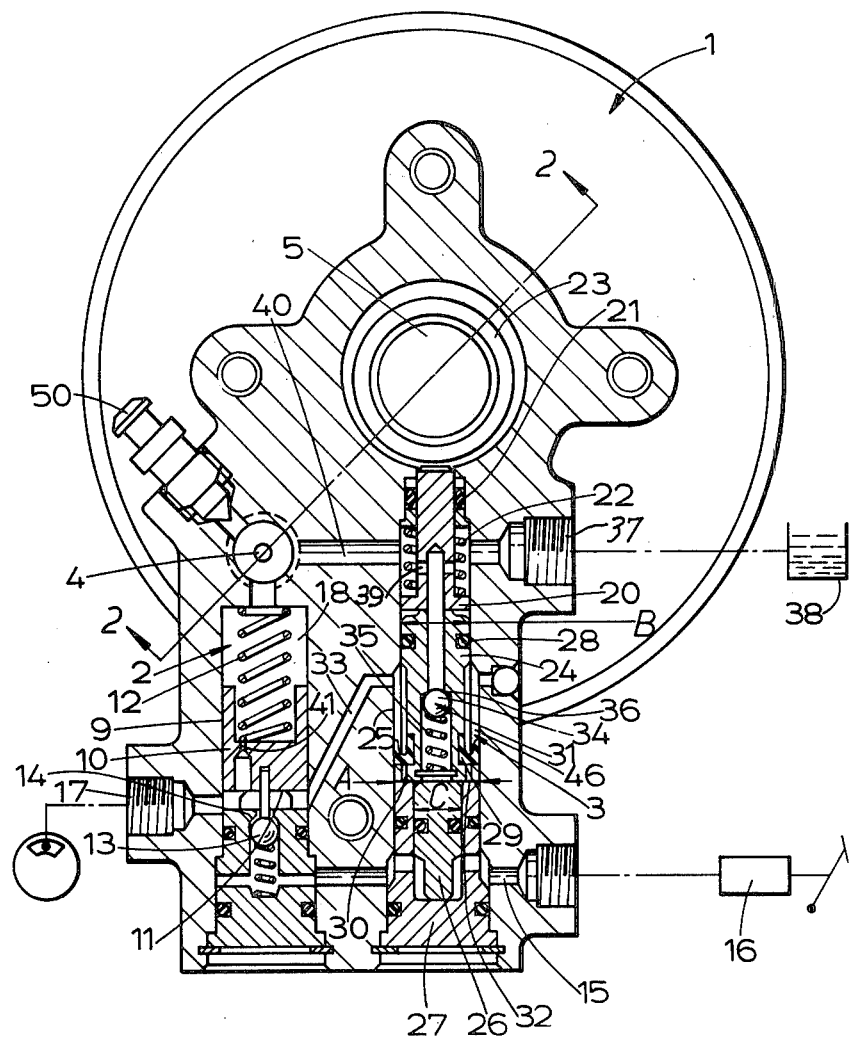
FIG. 1 is a transverse section through a combined modulator and skid sensing assembly for an hydraulic anti-skid braking system suitable for a motor-cycle.
Figure 2:
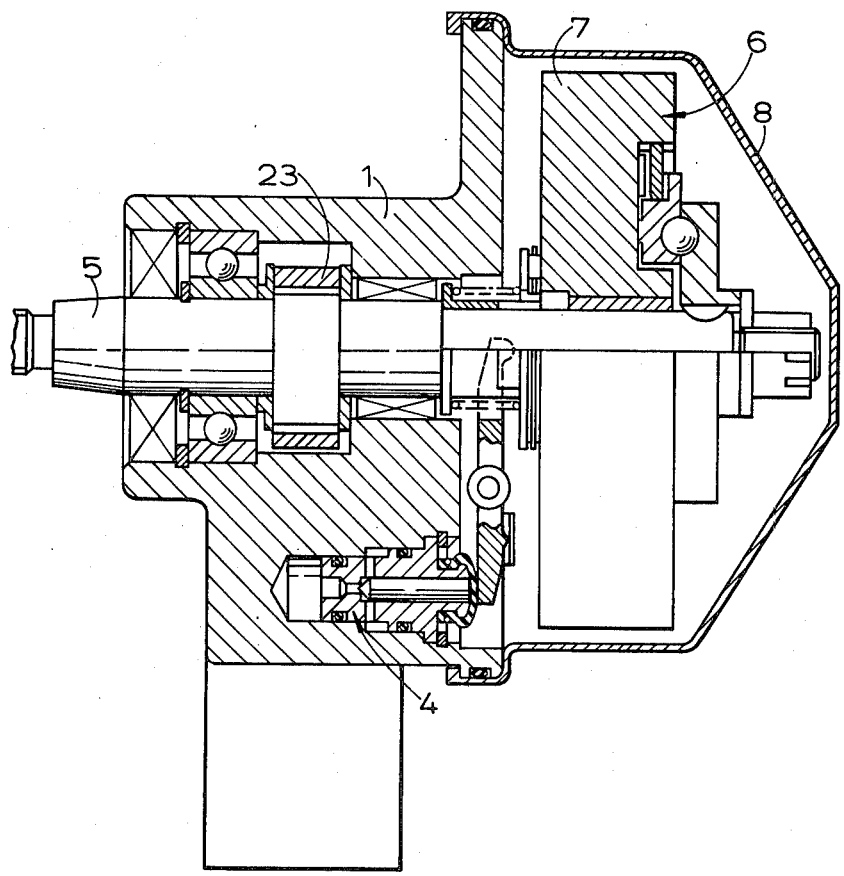
FIG. 2 is a section on the line 2—2 of FIG. 1.

The assembly illustrated in FIGS. 1 and 2 of the drawings comprises a housing 1 incorporating a modulator assembly 2, an hydraulic pump 3 and a pressure dump valve 4. A longitudinally extending shaft 5 projecting at opposite ends from the housing 1 is coupled at one end to the wheel and at the other end carries skid sensing means 6 in the form of a flywheel assembly 7 which is enclosed within a cylindrical guard 8 carried from the adjacent end of the housing 1. The dump valve 4 and the skid sensing means 6 are described in our co-pending G.B. patent specification No. 2069641 and need not be described further herein.

The modulator assembly 2 comprises a bore 9 in which works a sealess piston 10 which is normally urged into an inoperative position against a stop 11 by a relatively light spring 12. In this position the piston 10 urges a spring-loaded ball 13 away from a seating 14 to place an inlet port 15 for connection to an hydraulic master cylinder 16 in communication with an outlet port 17 for connection to a brake associated with the wheel which drives the shaft 5. The dump valve 4 is in communication with that end of the bore 9 which is remote from the valve 13, 14.

The pump 3 comprises a tappet 20 of stepped outline of which the end of smaller area works through a seal 21 in the housing 1 and is urged by a spring 22 away from the drive mechanism comprising a ring 23 which is freely rotatable on an eccentric portion of the shaft 5. A pump plunger 24 comprising a differential piston working in a stepped bore 25 is adapted to be engaged at its end of smaller area by the tappet 20 and at its end of greater area by a drive piston 26 working in the bore of a sleeve 27 of cup-shaped outline which acts as a closure for the end of the bore 25 which is of greater area. The end of the drive piston 26 remote from the plunger 24 is exposed to the pressure in the master cylinder 16.

The inner end portion of the pump plunger 24 which is of smaller area carries an 'O' ring seal 28 engaging slidably with the complementary portion of the bore 25 and the portion which is of greater area carries a lip seal 29 engaging slidably with the complementary portion of the bore 25. A secondary working chamber 46 is defined by the annular volume bounded by the bore 25, the plunger 24, the seal 28, and the seal 29.

A primary working chamber 30 is defined in the plunger 24 and the bore 25 between a first one-way valve 31 in the plunger 24, the drive piston 26, and a second one-way valve constituted by the lip seal 29 controlling flow through ports 32 in the end of the plunger 24 which is of greater area.

The lip seal 29 area permits flow from the primary working chamber 30 to the secondary working chamber 46, which is connected by a passage 33 to an expansion chamber between the piston 10 and the stop 11. The first one-way valve 31 comprises a ball 34 which is normally urged by a spring 35 in a direction to engage with a seating 36 in the plunger 24 to isolate the primary working chamber 30 from communication with a port 37 connected to a reservoir 38 through supply passages 39 in the tappet 20.

A support chamber 18 is defined by that portion of the bore 9 between the piston 10 and the dump valve 4, the passage 33, and the secondary working chamber 46.

A return passage 40 to the reservoir 38 communicates with the support chamber 18 when the dump valve 4 is open.

The area C of the drive piston 26 is equal to or smaller than the difference in area between the area A and B of the greater and smaller area ends of the plunger 24.

The piston 10 is provided with a restricted orifice 41 which provides communication at all times between the support chamber 18 and the expansion chamber.

When the wheel is rotating in a "brakes-off" condition, the dump valve 4 is closed to cut-off communication between the reservoir 38 and the support chamber 18 and the piston 10 is held by the spring 12 in the advanced position shown. The plunger 24 is held in an inoperative retracted position shown, by the fluid trapped between the dump valve 4 and the lip seal 29 which constitutes the second one-way valve, and by the spring 22. Thus the pump 3 is disabled and no pumping can take place.

During normal braking, fluid from the master cylinder 16 is applied to the brakes through the ports 15 and 17, and through the clearance between the ball 13 and the seating 14, and acts on the area of the pump plunger 24 between the seals 28 and 29. In addition the pressure from the master cylinder 16 acts on the drive piston 26 to urge it, and the pump plunger 24, relatively towards the ring 23. However since the area C is smaller than the difference between the areas A and B the drive piston 26 and the plunger 24 are unable to move so that the pump 3 remains disabled.

If the angular deceleration of the braked wheel exceeds a predetermined value, the skid sensing means 6 is operative to open the dump valve 4. This relieves the pressure trapped in the support chamber 18, by connecting it to the reservoir 38 through the return passage 40.

Due to the presence of the restricted orifice 41 the piston 10 is unbalanced so that it moves against the load in the spring 12 to permit the ball 13 to engage with the seating 14 which cuts off the supply to the brake. Further movement of the piston 10 in the same direction expands the brake volume to reduce the pressure applied to the brake with that fluid displaced from the brake being subsequently returned to the reservoir 38 through the orifice 41 and the dump valve 4. This same reduction in pressure in the support chamber 18 reduces the force on the plunger 24 which opposes the force of the pressure from the master cylinder 16 acting on the drive piston 26. Thus the drive piston 26 and the tappet 20 are able to urge the plunger 24 relatively towards the ring 23 through a distance sufficient for the tappet 20 to engage with the ring 23. Thus the plunger 24 is reciprocated in the bore 25 by the ring 23 which, in turn, is oscillated by rotation of the shaft 5.

The output of the pump 3 is determined by the stroke of the plunger 24 multiplied by the areas (A-C).

As the plunger 24 is moved towards the ring 23 fluid from the reservoir 38 is drawn into the increasing volume of the primary working chamber 30 through the first one-way valve 31, and the lip seal 29 pumps fluid from the secondary working chamber 46 into the passage 33. As the plunger 24 is moved in the opposite direction the first one-way valve 31 closes and the fluid in the primary working chamber 30 is displaced past the lip seal 29. Since the volume of the secondary working chamber 46 is less than that of the primary working chamber 30, some of the displaced fluid passes into the passage 33.

The pump 3 is therefore double-acting to pump fluid into the passage 33 upon movement of the plunger 24 in each of two opposite directions.

While the dump valve 4 remains open fluid is pumped by the pump 3 in a closed circuit from the reservoir 38, to which it is returned after passing through the expander chamber and the support chamber 18, and the piston 10 is held in a retracted position due to the pressure drop across the orifice 41.

At the termination of a skid signal the dump valve 4 closes to isolate the support chamber 18 from the reservoir 38, so that the pump 3 is then operative to increase the pressure in the expansion chamber which is applied to the brake, and the expander piston 10 moves back slowly to its original position under the influence of the spring 12. This continues until the pressure from the pump 3 attains the pressure of the master cylinder 16. At this point the pump 3 stops pumping and the spring 12 urges the piston 10 into its advanced position to open the valve 13, 14 as the pressures on opposite sides of the piston 10 are equalised by the restrictor 41. Communication between the master cylinder 16 and the brake is therefore re-established.

The system described above can be easily bled by a bleed screw 50, and bleeding is facilitated by the passage 41 which provides communication between opposite sides of the piston 10.

The construction described above is suitable for use with motor cycles or light motor cars. In a modification the pump 3 can be driven from the prime mover of the vehicle or by an electrically driven shaft independently of the shaft on which the wheel is mounted.

Figure 3:
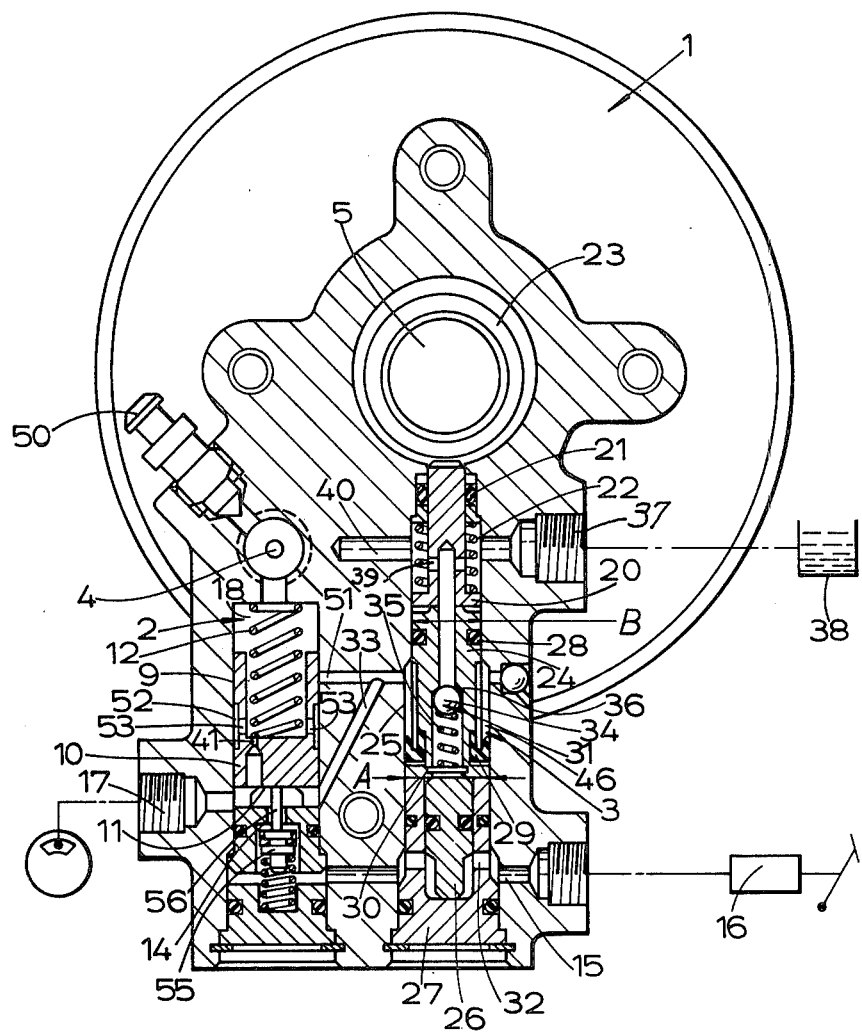
FIG. 3 is a transverse section similar to FIG. 1 but showing a modification.

In the assembly illustrated in FIG. 3 of the drawings the upper portion of the passage 33 is extended across the housing 1 and terminates at a port 51 in the wall of the bore 9. A radial groove 52 of substantial axial length is provided in the outer face of the piston 10 and, in the advanced position of the piston 10 shown in the drawings, the groove 52 is spaced from the port 51 in a direction towards the stop 11 so that the port 51 is closed by the piston 10. A transverse drilling through the piston 10 provides a pair of diametrically opposed ports 53 which provide permanent communication between the groove 52 and the support chamber 18.

The spring-loaded ball 14 is replaced by a flat valve head 55 for engagement with the seating 14 and the valve head 54 is carried by a stem 56 with which the piston 10 is engageable.

As described above with reference to the construction illustrated in FIGS. 1 and 2 of the drawings, opening of the dump valve 4 by the skid sensing means 6 relieves the pressure trapped in the support chamber 18, by connecting it to the reservoir 38 through the return passage 40. Due to the presence of the restricted orifice 41 the piston is unbalanced so that it moves against the load in the spring 12 to permit the head 54 to engage with the seating 14, which cuts off the supply to the brake. Further movement of the piston 10 in the same direction expands the brake volume to reduce the pressure applied to the brake with that fluid displaced from the brake being subsequently returned to the reservoir 38 through the orifice 41 and the dump valve 4. This movement of the piston 10 against the load in the spring 12 continues to expand the brake volume at least until the radial groove 52 comes into alignment and establishes communication with the port 51. In such a position fluid from the brake is returned to the reservoir through the support chamber 18 and through a by-pass defined by the passage 33, the port 51, the groove 52, and the ports 53, without that fluid first passing through the restricted passage 41.

When the braked wheel of the vehicle is travelling over a surface of which the co-efficient of friction is substantially constant, movement of the piston 10 against the force in the spring 12 to expand the brake volume will normally be sufficient to achieve a sufficient relief of brake pressure and the groove 52 will not normally come into communication with the port 51 in order to establish the by-pass. However when the braked wheel passes from a surface having a relatively high co-efficient of friction to one having a relatively low co-efficient of friction, the piston 10 moves further in the same direction to establish the by-pass. This enables the modulator rapidly to dump large volumes of fluid from the brake in order to achieve a relief of brake pressure with sufficient rapidity in order to cater for the change in surface conditions.

The construction and operation of the assembly of FIG. 3 is otherwise the same as that of FIGS. 1 and 2, and corresponding reference numerals have been applied to corresponding parts.

I claim:

1. An hydraulic anti-skid braking system for a vehicle having a wheel, comprising a brake for braking the wheel, a supply of brake-operating fluid for applying said brake, skid sensing means for said wheel for producing skid signals, a modulator assembly for modulating said brake-applying fluid from said supply to said brake in accordance with said skid signals, and an hydraulic pump incorporating at least one plunger working in a bore and having a working chamber which is in communication with said modulator assembly to control brake re-application following skid correction, wherein said modulator assembly comprises a housing provided with a wall defining a bore, a piston working in said bore and movable between a first advanced inoperative position and a second retracted position spaced from said inoperative position, a stop with which said piston in adapted to co-operate to define said first inoperative position, a spring for urging said piston towards said stop, a spring-loaded one-way valve adapted to be operated by said piston, said one way-valve being movable between an open position and a closed position, an inlet port connected to said supply, an outlet port connected to said brake, said one-way valve being held in said open position to place said inlet port in communication with said outlet port when said piston is in said first position, means defining support and expander chambers in said bore on opposite sides of said piston, a reservoir for fluid, a dump valve between said support chamber and said reservoir, and a restricted passage providing at all times a permanent connection between said support and expander chambers, and wherein the position of said piston in said bore is determined by the loading in said spring either augmented or opposed by a force applied to said piston due to any pressure drop across said restricted passage.

2. A system as claimed in claim 1, wherein said piston does not carry a seal.

3. A system as claimed in claim 1, wherein said support chamber and said expander chamber are also interconnected by a by-pass which remains closed until said piston has been moved away from said advanced position and towards said retracted position through a predetermined distance at least sufficient to enable said spring-loaded valve to close whereafter said by-pass opens to permit fluid from said brake to be returned to said reservoir, without first passing through said restricted passage.

4. A system as claimed in claim 3, wherein said by-pass is constituted by a passage in said housing having first and second opposite ends, said first end of said passage being in permanent open communication with said expander chamber and said second end terminating at a port in said wall of said bore, said port being adapted to be closed by said piston whereby to close said by-pass, said piston being provided with radial passage means to provide communication between said expander and support when said piston has moved through the said predetermined distance at which point said radial passage means and said port are aligned.

5. A system as claimed in claim 4, wherein said radial passage means comprises a radial groove in a wall of said piston adjacent to said bore, and a diameteral passage in said piston connecting said groove to said support chamber, whereby said piston acts in a similar manner to that of a valve spool.

6. A system as claimed in claim 1, wherein pressure from said pump is supplied directly to said expander chamber.

7. A system as claimed in claim 1, wherein said restricted passage comprises an orifice in said piston itself.

* * * * *